United States Patent [19]

Timothy et al.

[11] 4,070,578
[45] Jan. 24, 1978

[54] DETECTOR ARRAY AND METHOD

[76] Inventors: John G. Timothy, 85 E. India Row, Boston, Mass. 02110; Richard Lee Bybee, 955 McIntire, Boulder, Colo. 80303

[21] Appl. No.: 710,178

[22] Filed: July 30, 1976

[51] Int. Cl.$^2$ ............................................. G01T 1/29
[52] U.S. Cl. ................................. 250/336; 250/207; 250/370; 313/103 CM
[58] Field of Search ............... 250/336, 370, 371, 207; 313/103 CM, 105 CM

[56] References Cited

U.S. PATENT DOCUMENTS

| | | | |
|---|---|---|---|
| 3,408,532 | 10/1968 | Hultberg et al. | 313/105 CM X |
| 3,415,992 | 12/1968 | Webb | 250/370 |
| 3,529,161 | 9/1970 | Oosthoek et al. | 250/370 |
| 3,701,923 | 10/1972 | Goede | 313/105 CM X |
| 3,757,351 | 9/1973 | Simms | 250/336 X |
| 3,965,354 | 6/1976 | Fletcher | 250/336 |

*Primary Examiner*—Archie R. Borchelt
*Attorney, Agent, or Firm*—Cushman, Darby & Cushman

[57] ABSTRACT

A detector array and method are disclosed in which plural sets of electrode elements are provided with each set comprising a plurality of linear extending parallel electrodes. The sets of electrode elements are disposed at an angle (preferably orthogonal) with respect to one another so that the individual elements intersect and overlap individual elements of the other sets. Electrical insulation is provided between the overlapping elements. The thus configured detector array is exposed to a source of charged particles which in accordance with one embodiment comprise electrons derived from a microchannel array plate exposed to photons. Amplifier and discriminator means are provided for each individual electrode element. Detection means is provided to sense pulses on individual electrode elements in the sets, with coincidence of pulses on individual intersecting electrode elements being indicative of charged particle impact at the intersection of the elements. Electronic readout means are provided to provide an indication of coincident events and the location where the charged particle or particles impacted. Display means are provided for generating appropriate displays representative of the intensity and location of charged particles impacting on the detector array.

11 Claims, 8 Drawing Figures

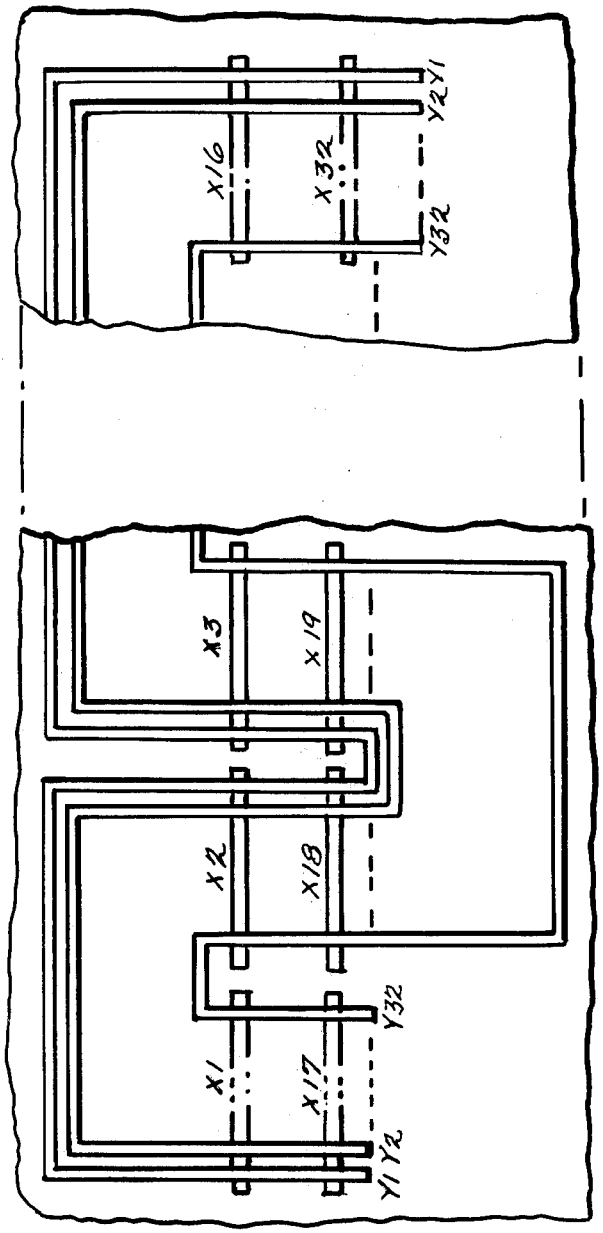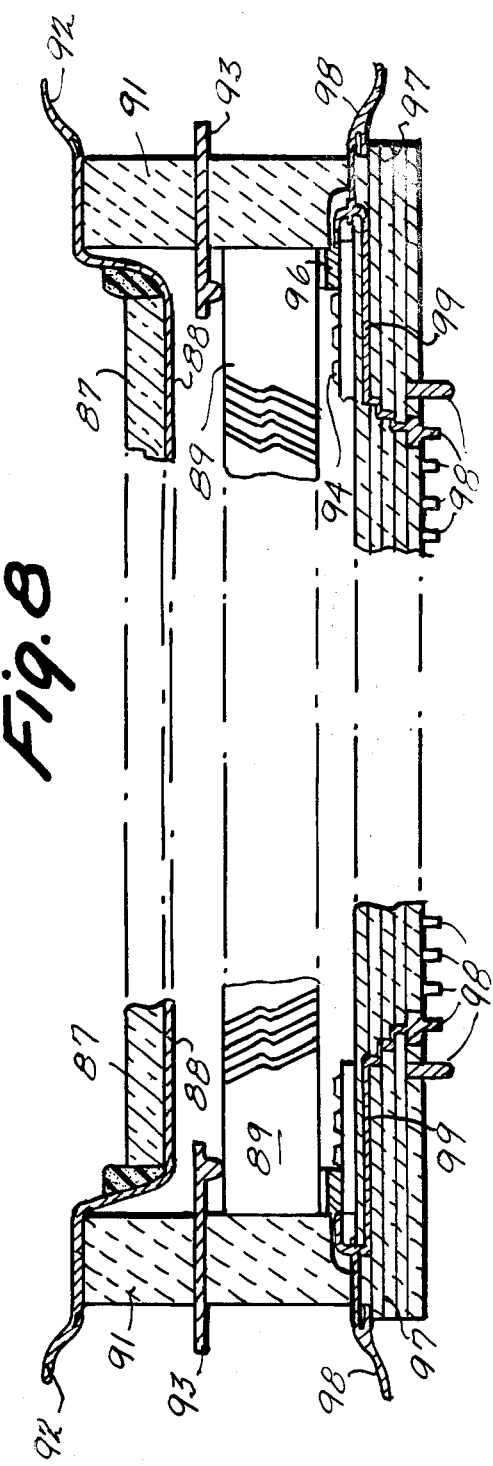

DETECTOR ARRAY AND METHOD

BACKGROUND OF THE INVENTION

This invention pertains to a detector array and method for detecting charged particles and in accordance with one embodiment pertains to such a detector array and method for use with microchannel array plates for photon counting.

One of the important applications of charged particle detector arrays has been in connection with detector arrays for photon counting. In the prior art, instruments for photometric studies such as at ultraviolet and x-ray wavelengths have been either photographic or photoelectric. Photographic instruments, employing film as the detection system, have the great advantage of an image-storing capability. It is therefore possible to use this type of instrument to record a very large amount of data with a single exposure. However, the sensitivity of photographic film is considerably lower than that of a photoelectric detector and the quantum efficiency is typically less than a photoelectric detector. Further disadvantages include the fact that the photographic film response is non-linear as a function of the incident energy, and since the output signal is not electrical in character the photographic film must be recovered, thus inhibiting to some extent its use on orbiting satellites.

Photoelectric instruments, on the other hand, are more sensitive and have a greater stability of response and provide a linear output as a function of the incident energy. However, since most photoelectric detectors do not have image-recording capabilities, the data must be readout sequentially, point-by-point. Consequently, the overall speed of the system is quite low.

The development of the channel electron multiplier and its miniaturization into the microchannel array plate have been important developments in the field of photometrics, combining the advantages of both the photographic and the photoelectric detection systems. The microchannel array plate can be operated as an image-intensifier and has the potential of being developed to yield signal outputs superior to those of conventional photomultipliers. In particular, the microchannel array plate has a photo-counting capability and a negligible dark count rate. These devices can operate stably and efficiently at extreme ultraviolet (EUV) and soft x-ray wavelengths in a windowless configuration or can be installed with a photocathode in a sealed tube for use at ultraviolet and visible wavelengths.

The readout systems generally employed with microchannel array plates in the prior art have been a visible-light phospor coupled to either a vidicon tube or photographic film. In this arrangement, the detected photon is converted to a pulse of electrons in the microchannels; these electrons are accelerated towards the phospor and reconverted to visible photons, which are detected by either the vidicon photocathode or the photographic emulsion. Although the microchannel array plate can provide a gain on the order of $10^7$, this system is cumbersome and has all the inherent disadvantages of either the photographic plate or the vidicon tube.

In order to exploit the full sensitivity, dynamic range and photometric stability of the microchannel array plate, it is necessary to employ pulse-counting readout systems working directly at the output of the plate. Some examples of pulse-counting systems to readout spatial information from microchannel array plates have been described in the prior art, but have been designed to employ a limited number of amplifiers, two for a one-dimensional array and four for a two-dimensional array, and have consequently been limited in terms of dynamic range and spatial resolution. This is especially the case for applications at high signal levels such as from laboratory EUV and soft x-ray sources or from telescopes for solar studies at EUV and soft x-ray wavelengths. There have been suggestions of a multielement anode array in the prior art, such as in "The Multianode Photomultiplier", by Catchpole and Johnson, Pub. Astron. Soc. Pacific, volume 84, February 1972, pages 134–136. This article discloses a detector array for use with a microchannel array plate in which a two-dimensional array of individual anode elements ($10 \times 10$ anode array) is provided. Individual amplifier and electronic means appear to be contemplated for each of the individual anode elements. That article further indicates that an alternative readout possibility was contemplated, in which a resistive strip anode was utilized, which is made to act as a voltage divider. Comparison of the pulses at the channel plate and at one end of the resistive anode would enable the position of the pulse to be calculated electronically. This article acknowledges that such a system would have limitations in the maximum pulse rate could handle.

Another version of such a resistive anode readout system for a detector array is described in an article by G.M. Lawrence and E.J. Stone, "Rev. Sci. Instrum. 46, 432" (1975). Such systems have a limited dynamic range and have pincushion distortion inherent in the system.

In applicants' copending application Ser. No. 693,954, filed June 8, 1976 and entitled "ONE-DIMENSIONAL PHOTO-COUNTING DETECTOR ARRAY", there is disclosed and claimed a one-dimensional detector array system having good spatial resolution and dynamic range. In that system, the output of a microchannel array plate is proximity focused on a detector array comprising a plurality of parallel, linearly extended anode elements. Individual amplifier and discriminator means are provided for each of the anode elements.

OBJECTS AND SUMMARY OF THE INVENTION

It is an object of this invention to provide a system and method for providing a two-dimensional detector array having good spatial resolution and dynamic range.

It is a more specific object for this invention to provide such a system and method in which a large number of picture elements are provided without requiring separate amplifier and discriminator means for each picture element.

It is a further object of this invention to provide such a system and method in which a plurality of sets of electrode elements are provided, with each set having a plurality of individual electrode elements. The sets of electrode elements intersect and overlap each other to form, e.g. rows and columns, with coincident detection means provided for detecting a simultaneous event in a row and column.

It is a further object of this invention in accordance with a specific embodiment to provide a two-dimensional coincidence detector array in association with a channel electron multiplier proximity focused thereon to provide a two-dimensional photon-counting detector array.

Briefly, in accordance with one embodiment of the invention, a charged particle detector array is provided for use with a two-dimensional source of charged particles. An electrode array is provided adjacent to the two-dimensional source with the charged particles being imaged upon the electrode array. The electrode array comprises a plurality of sets of electrode elements, each set in turn comprising a plurality of individual electrode elements. Each of the sets of electrode elements are oriented at predetermined angles (preferably orthogonally) with respect to each other so that individual elements of each set intersect and overlap individual elements of the other sets to form a charged particle counting zone in the vicinity of overlapped elements. Electrical insulating means insulates the intersecting and overlapping elements from each other. Amplifier and discriminator means are connected to each individual linearly extending electrode element for generating output pulses in response to charged particle impacts thereon. Coincidence detection means is provided for detecting approximately coincident output pulses from an amplifier and discriminator means in each set of electrode elements, the occurrence of which is indicative of charged particles impinging in the charged particle counting zone at the intersection of the respective elements with respect to which the coincident output pulses appear.

BRIEF DESCRIPTION OF THE DRAWINGS

Further objects and advantages of the present invention will appear from the following detailed description of the preferred embodiments thereof taken in conjunction with the accompanying drawings wherein:

FIG. 7 is a top plan view of one embodiment of the invention showing a linear-extended electrode array; and FIG. 8 is a cross-sectional schematic view of a photon-counting wafer tube as might be suitable for utilizing the coincidence detector electrode array of the present invention.

DETAILED DESCRIPTION

Figure 1:
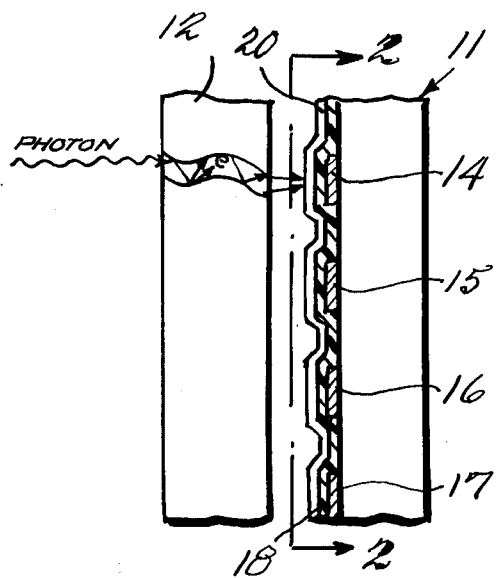
FIG. 1 is a schematic side cross-sectional view of a two-dimensional coincident electrode array illustrating schematically its use with a microchannel array plate for photon-counting.
Figure 2:
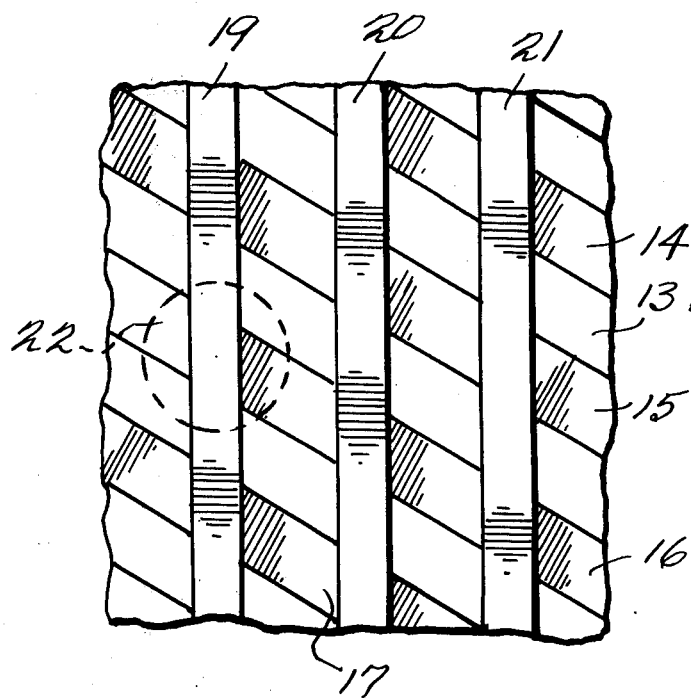
FIG. 2 is a top isometric view taken along the lines 2—2 in FIG. 1 of the detector array.

Turning now to FIGS. 1 and 2, there is illustrated in schematic form one embodiment of a two-dimensional electrode array in accordance with this invention. In FIG. 1 a two-dimensional electrode array 11 is shown in proximity focus to the output face of a microchannel array plate 12. In response to incident photons, the microchannel array plate 12 (being provided with suitable accelerating potential and biasing potentials) generates electrons and multiplies these electrons, with the output of the microchannel array plate 12 being proximity focused on the electrode assembly 11. The microchannel array plate 12 in FIG. 1 is illustrated as being a single microchannel array plate having curved microchannels therein (only one microchannel is illustrated in FIG. 1). Alternatively, a microchannel array of two or more plates having straight microchannels but being arranged in a chevron relationship can be utilized. As known to those skilled in this art, the curved microchannels in the microchannel array plate or alternatively the chevron arrangement of microchannels into adjacent plates, serves to inhibit ion feedback which could otherwise lead to instability in operation of the microchannel array plate.

The two-dimensional electrode array 11 comprises an insulating substrate 13 which may for example be a quartz substrate. The top surface of the substrate 13 should be reasonably flat, and in accordance with a particular embodiment has been polished flat to better than 2 microns. Upon the top surface of the substrate 13 a first set of electrodes is deposited, such as by evaporation or sputtering techniques. This first set of electrodes can consist of a great many linearly extending parallel electrodes; four electrodes 14, 15, 16 and 17 are illustrated in FIGS. 1 and 2. As a typical example of the dimensions involved, this first set of electrodes 14–17 can be 25 microns in width, 1.6 millimeters in length, and set on 50 micron centers.

Thereafter, the first set of electrodes 14–17 is covered with an insulating layer, such as an evaporated quartz film which can be, for example, 2500 A thick. This insulating layer is illustrated in the drawings by reference numeral 18. A second set of electrodes is then deposited on top of the insulating quartz film, such as by evaporation or sputtering. Of course a large number of these electrodes may be provided, with there being three electrodes 19, 20, and 21 illustrated in FIGS. 1 and 2. As illustrated in the drawings, the second set of electrodes 19–21 are all parallel with each other and linearly extending, but are oriented at an angle (preferably right angles) with respect to the first set of electrodes 14–17. Therefore, individual electrode elements intersect and overlap each other to form charged particle counting zones or picture elements (pixels) at their intersection and overlapping. In fabricating the electrode assembly, following the deposition of the second set of electrodes 19–21, photomasking can be applied to protect the upper electrodes 19–21, with the quartz insulating film or layer 18 in the spaces between the upper electrodes then being etched away such as by plasma discharge to expose the lower electrodes as shown in FIG. 2. Thus, there results a matrix-like array with one set of electrodes 14–17 being parallel to one another and extending in one direction, and a second set of electrodes 19–21 being electrically insulated from the first and running in another direction so as to form intersecting overlapping zones with the first set of electrodes. Each of these overlapping zones, identified by reference numeral 22 in FIG. 2, is a charged particle counting zone or picture element (pixel).

With this kind of electrode arrangement, the output charge from the microchannel array plate 12 falls on the charged particle counting zones 22 or picture elements, with the incident output charge being divided between the two overlapping electrodes at that picture element. In accordance with a specific embodiment of the invention, the uppermost electrodes 19–21 were 15 microns in width, 1.6 millimeters in length, and set on 50 micron centers. By making the uppermost electrodes of a narrower width than the bottommost electrodes, the exposed areas of the two sets of electrodes for any given picture element 22 are approximately equal, so that the output charge from the microchannel array plate falls in approximately equal amounts on both of the electrodes, i.e. electrode 16 and electrode 19 in FIG. 2.

As will be hereinafter described, individual amplifier and discriminator means are provided for each electrode element in each set. If two sets of electrode elements are used, they can be referred to as row and column electrode elements, or anodes in the case of the specific arrangement shown in FIGS. 1 and 2. Since the output charge from the microchannel array plate (or any other two dimensional source of charged particles) is divided between the row and column electrodes at the intersection where the event occurs, the spatial location of the event can be identified by the coincident arrival of pulses on the appropriate row and column anodes. It is possible with this kind of method and system for a detector array to obtain photometric information from (N×M) pixels using only (N+M) amplifier and discriminator circuits. In accordance with a specific embodiment of the invention, a detector array was constructed in which two sets of electrode elements are provided with each set comprising 32 individual elements. Therefore, a detector array having 1024 picture elements resulted.

Figure 3:
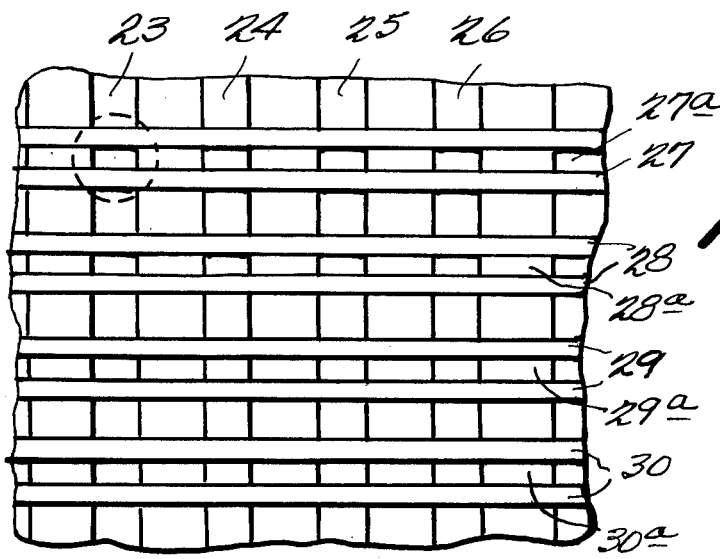
FIG. 3 is a top plan view similar to FIG. 2 but illustrating an embodiment in which a top electrode has apertures formed therein.
Figure 4:
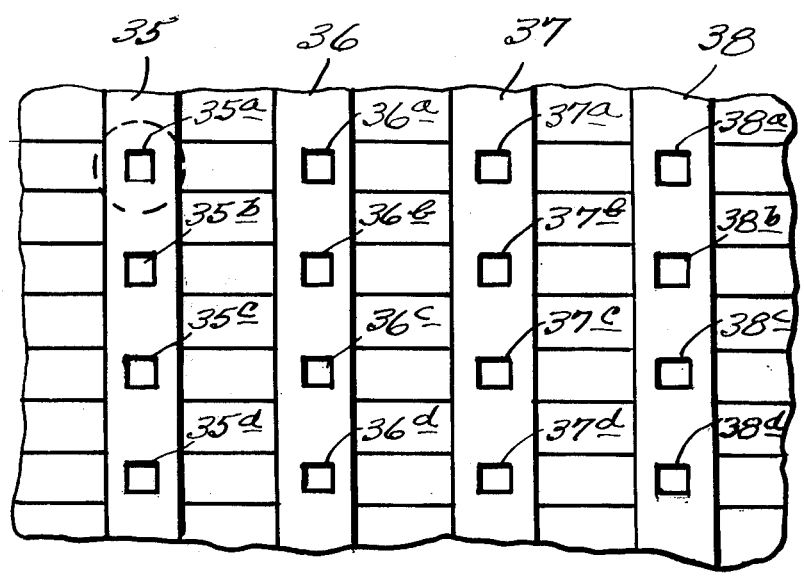
FIG. 4 is a top plan similar to FIG. 3 showing an alternative aperture embodiment for the electrode array.

Although FIGS. 1 and 2 illustrate the principles of this invention as applied to a coincidence detection electrode array in which two sets of electrode elements are provided, the principles of the invention are equally applicable to detector array systems in which three superimposed, intersecting and overlapping sets of electrode elements are provided as well as even four or more. If three sets of overlapping electrodes are provided, then the coincident arrival of pulses on all three superimposed overlapping electrodes is utilized as indicative of charged particle impact at the intersection of the three electrode elements, and so forth. For best results for a detector array in accordance with this invention, the overlapping and intersecting electrodes are configured so that an approximately equal surface area of each of the overlapping electrodes is exposed to the charged particle source at the pixel. One way to achieve this as described in connection with FIGS. 1 and 2 is to very the widths of the electrode elements in the various sets. Thus in FIG. 2 the uppermost electrode set has individual electrode elements which are of a more narrow width than the lower electrode elements. Other ways to achieve this approximately equal surface area of the electrode elements exposed to the charged particle source at the pixels are shown in FIGS. 3 and 4. In FIG. 3, a plurality of lower electrodes 23, 24, 25 and 26 are shown with a plurality of upper electrodes 27, 28, 29 and 30 disposed at an angle thereto and overlapping the bottom electrodes. Each of the upper electrode elements 27–30 has a linearly extending aperture 27a–30a formed therein so that the lower electrode is exposed through the aperture. With this configuration the width of the lower electrode, the width of the upper electrode, and the aperture width in the upper electrode are configured so that an approximately equal surface area of upper and lower electrode are exposed to the source charged particles at each charged particle counting zone or picture element 39.

FIG. 4 is similar to FIG. 3 and illustrates an alternative arrangement for configuring the sets of electrodes so that approximately equal surface areas of electrodes in the different sets are exposed to the source of charged particles. In FIG. 4 the first set of electrodes is provided which comprises a plurality of electrode elements 31, 32, 33 and 34. A second set of electrodes 35, 36, 37 and 38 are provided and are disposed as an angle (preferably right angles) with respect to the first set of electrodes so that they overlap the first set of electrodes. Of course, electrical insulation is provided underneath the second set of electrodes so that they are electrically insulated from the first set of electrodes. Apertures or windows are formed in the upper set of electrodes 35–38 at locations along these electrodes where they overlap the first set of electrodes 31–34. Thus of the electrodes shown in FIG. 4 the electrode 35 has apertures 35a–35d formed therein to expose portions of the underlying electrodes 31–34, and so forth. The width of the individual elements in the first and second sets of electrodes together with the dimensions of the apertures formed in the upper set of electrodes are controlled in order to provide an approximately equal surface area of the bottom and top electrodes at each of the charged particle counting zones or picture elements 40.

Figure 5:
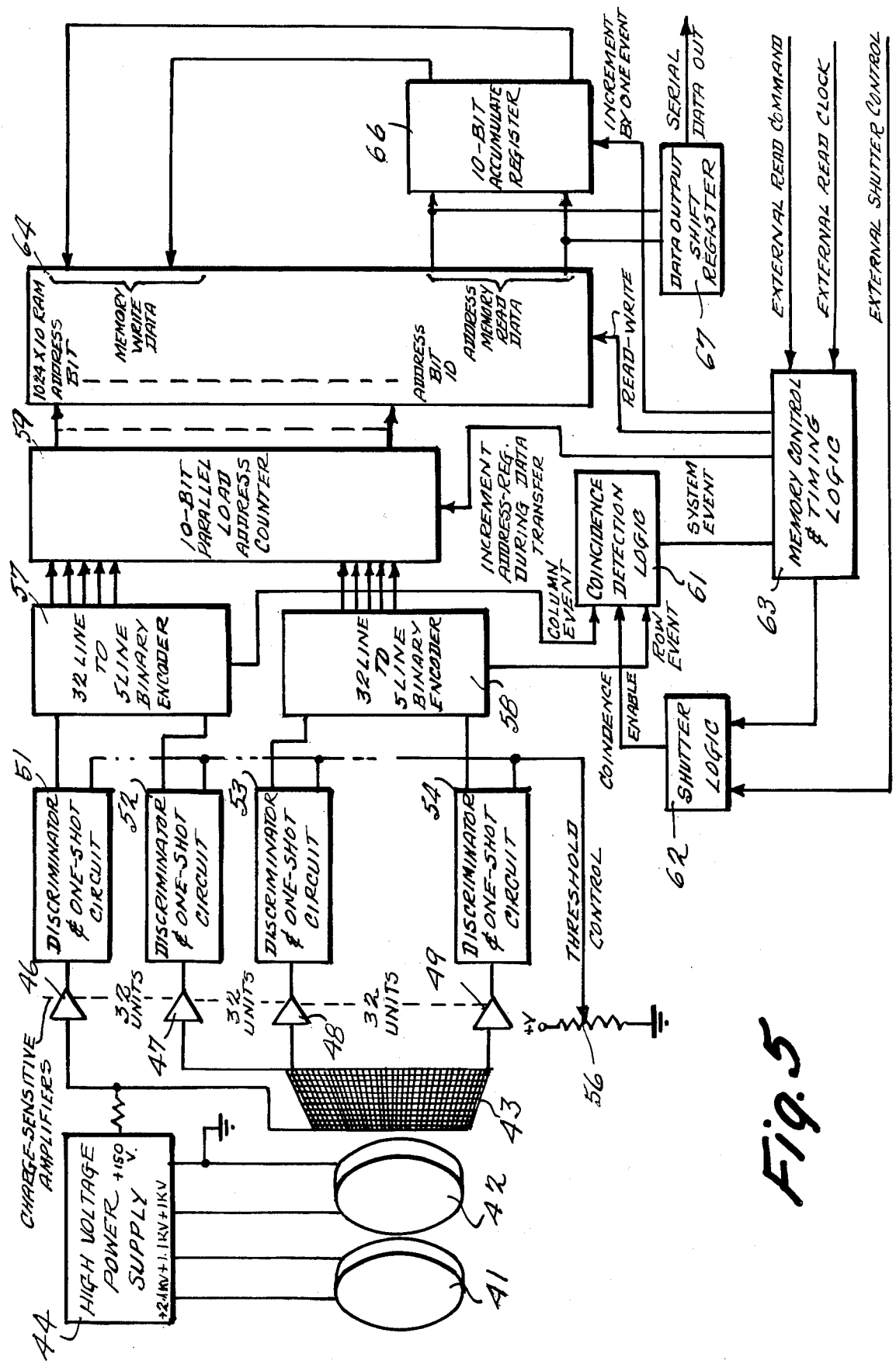
FIG. 5 is a schematic circuit diagram for the detector electronics for a coincidence two-dimensional electrode array in accordance with the present invention.

Turning now to FIG. 5, there is shown in block diagram form suitable electronic circuitry for use with the coincidence two-dimensional detector array of this invention in accordance with one embodiment thereof. In FIG. 5, there is schematically shown the use of two chevron arranged microchannel array plates 41 and 42 with the output of microchannel array plate 42 being proximity focused on a detector array 43. The detector array 43 is constructed in accordance with the principles of this invention to have plural sets of electrodes with each set of electrode elements comprising a plurality of the linearly extending parallel individual electrode elements. In accordance with the specific embodiments schematically illustrated in FIG. 5, two sets of approximately orthogonal electrode elements are provided, with there being 32 electrode elements in each set. A matrix-like array thus results having 32 × 32 = 1024 charged particle counting zones or picture elements. A suitable high voltage power supply 44 is provided for the accelerating and biasing potentials on the microchannel array plates 41 and 42 and on the detector array 43.

Since in accordance with the embodiment shown in FIG. 5 only two sets of electrode elements are utilized, we can refer to one set of electrode elements as row anodes and the other set of electrode elements as column anodes.

A separate charge sensitive amplifier is provided connected to each of the 32 row anodes and to each of the 32 column anodes. Thus, a total of 64 charge sensitive amplifiers are provided. In FIG. 5, only two of the amplifiers for the column anodes are illustrated, these being amplifiers 46 and 47. Similarly, only two of the amplifiers for the row anodes are shown, these being illustrated in FIG. 5 as amplifiers 48 and 49. A discriminator and one-shot circuit is provided connected to each of the charge sensitive amplifiers. Thus, a total of 64 discriminator and one-shot circuits are provided, with four of these indicated by reference numerals 51, 52, 53 and 54 being illustrated in FIG. 5. The purpose of the discriminator and one-shot circuit is to eliminate any erroneous output indication caused by noise pulses which might be due to cross coupling between adjacent electrodes in the anode array. Suitable specific circuits for the charge amplifiers and for the discriminator and one-shot circuits are known, and one example of suitable specific circuits is set forth in "One-Dimensional Photon-Counting Detector Array For Use At EUV And Soft X-ray Wavelengths", by J.G. Timothy and R.L. Bybee, Applied Optics, volume 14, pages 1632–1644, July 1975, hereby incorporated by reference. The charge sensitive amplifiers integrate and amplify the charges on the respective anode elements and may, for example, provide an output pulse on the order of one volt where the input charge to the anode is on the order of $10^{-12}$C (equivalent to a gain of $6.3 \times 10^6$ in the microchannel array plate). Each of the discriminator and one-shot circuits are in accordance with a preferred embodiment a level discriminator and one-shot multivibrator circuit which generates a logic pulse compatible with the data handling circuits provided. For example, one embodiment of discriminator and one-shot circuit in accordance with the invention generated a 10 volt logic pulse, 300 nsec in width. Preferably, the discriminator threshold is adjustable, a typical adjustment range being $8 \times 10^{-13}$C ($5 \times 10^6$ electron/pulse) to $1.1 \times 10^{-11}$C ($7 \times 10^7$ electron/pulse). A threshold adjustment control 56 is schematically illustrated in FIG. 5.

In operation, the digital pulse data from the 32 column amplifiers and the 32 row amplifiers and discriminator circuits are fed to two 32-line-to-5-line binary encoders 57 and 58. These two encoders generate two 5-bit binary address words which are fed to a 10-bit parallel load address counter 59 in addition to row and column event pulses which are fed to a coincident detection circuit 61. The coincident detection circuit 61 also receives a COINCIDENCE ENABLE signal from shutter logic 62 which is in turn under control of memory control and timing logic circuitry 63. The shutter logic 62 permits the selection of a variety of integration times, which as an example can range from 0.25 seconds to 4096 seconds.

If a row and a column pulse occurred approximately in coincidence (say within 150 nsec of each other) the coincidence detection circuit 61 generates an event pulse which, in turn, causes the memory control and timing logic 63 to initiate the storage cycle of a 10-bit by 1024 word random access memory (RAM) 64. In this cycle, the 10-bit location address word is first loaded into the memory address register of RAM 64. The data stored in the address register are then read into a data output shift register 67 and loaded into the external register 66 which is a 10-bit accumulate register. This register 66 is then incremented by one event under control of the memory control and timing logic 63 and loaded back into memory of the RAM 64. In accordance with a specific embodiment of the invention, the total cycle time of the coincidence-detection and memory-address circuit is $1\mu$, allowing a total count rate of $10^6$ counts per second to be determined with this detector array.

Figure 6:
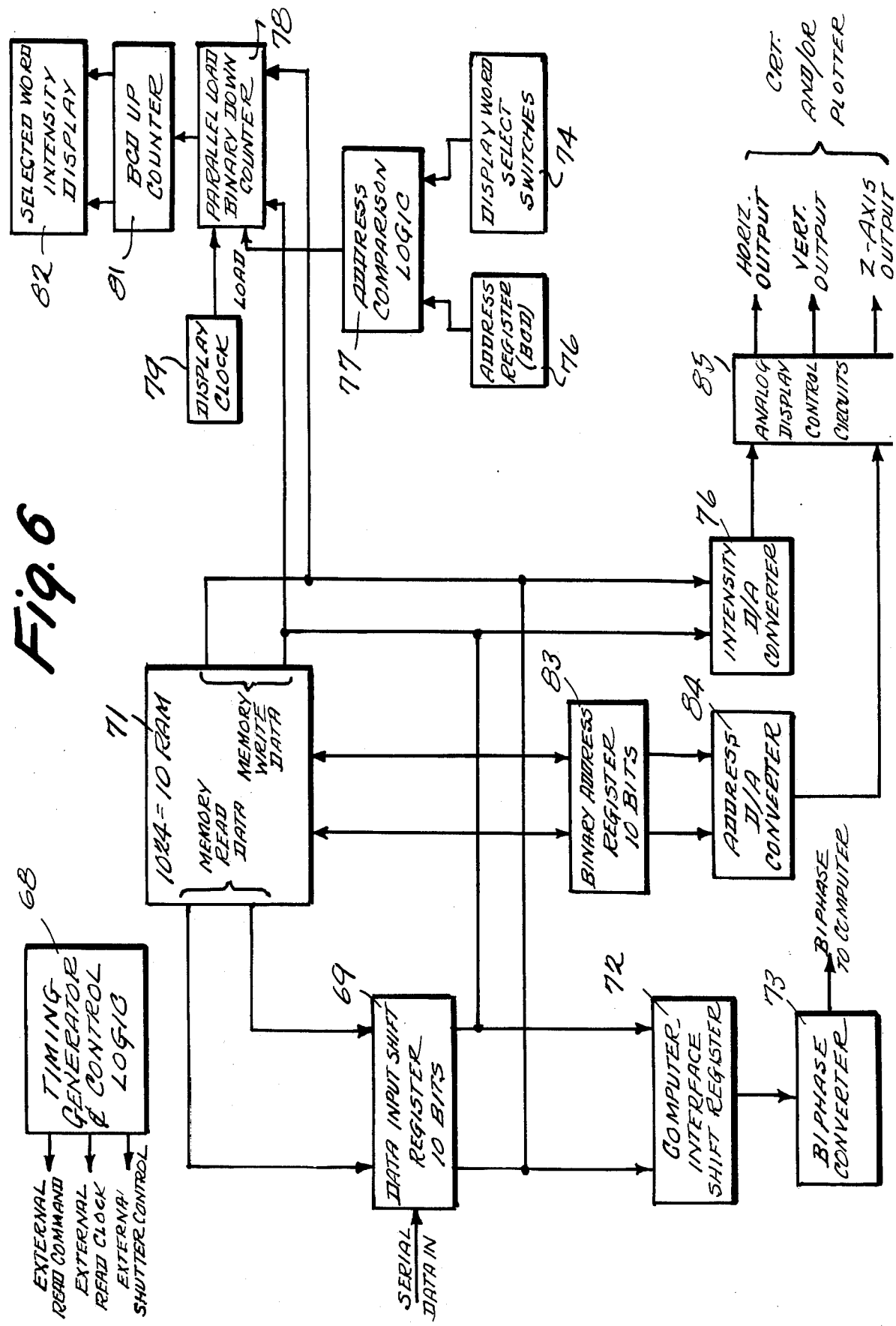
FIG. 6 is a circuit diagram of display electronics suitable for use with the detection electronics of FIG. 5.

FIG. 6 is a block circuit diagram of display electronics for use with the detector electronics shown in FIG. 5. A timing generator and control logic circuit 68 provides signals which are labeled EXTERNAL READ COMMAND, EXTERNAL READ CLOCK, and EXTERNAL SHUTTER CONTROL. These signals control the memory control and timing logic circuit 63 and the shutter logic 62. The display electronics of FIG. 6 includes a data input shift register 69 into which the serial data from data output shift register 67 of the detector electronics in FIG. 5 is connected. An additional 1024 × 10 bit random access memory (RAM) 71 is provided as part of the display electronics. This RAM 71 stores the data to allow refresh of the display circuits and to produce a serial biphase output which can be coupled to an on-line digital computer. This is achieved through a computer interface shift register 72 and biphase converter 73.

A display word select switches circuit 74 is provided along with an address register 76 forming inputs to address comparison logic 77. The address comparison logic 77 loads into a parallel load binary down counter 78 under control of a display clock 79 a signal indicative of the accumulated count in the particular words selected by display words select switches 74. This is coupled through a BCD up counter 81 to suitable selected words intensity display 82 which displays the accumulated count (intensity) of the particular word or picture elements selected by the switches 74.

The display system illustrated in FIG. 6, in addition to displaying in digital format the count in any selected address in the memory, also includes provision for displaying the intensity in all 1024 pixels in analog format on a CRT or plotter. Thus a binary address register 83 is coupled to the RAM 71 with an address d/a converter 84 provided to generate an address input to analog display control circuits 85. An intensity d/a converter 86 is coupled to the RAM 71 and provides an input to the analog display control circuit 85 indicative of the count for the respective pixels. The analog display control circuits 85 generate horizontal and vertical outputs as well as a Z-axis output which can be coupled to a CRT and/or a plotter for displaying the intensities in all 1024 pixels in analog format.

Turning now to FIG. 7, there is shown an embodiment of the invention in which a linear extended electrode array can be formed by "unfolding" a 32 × 32 matrix array. FIG. 7 illustrates the basic concept of forming such a linear extended array. In FIg. 7 the 32 X electrode elements of one set X1–X32, are arranged in two rows. The two rows are parallel and each of the 16 elements in each row is arranged end-to-end but separated by a small space. The 32 electrode elements of the other set, Y1–Y32, are then convoluted to cross back and forth across all of the X electrodes of the first set. The intersection of each of the Y electrodes with each of the X electrodes is a pixel, thus resulting in a linear extended array of 2 by 512 pixels utilizing a total of only 64 electrode elements, with corresponding 64 amplifiers and discriminators.

Such two-dimensional coincidence arrays in an extended linear format as shown in FIG. 7 can, of course, be arranged in many different ways. Such linear extended formats are ideally suited for use in high efficiency spectrometers for faint object spectroscopy. The format of the array can be exactly matched to the dispersion characteristics of the diffraction grating utilized, and in addition, spectra of source and background can be recorded simultaneously. The pixels can be formed so that the individual elements of each electrode set have approximately the same electrode area exposed to the source of charged particles, either by tailoring the dimensions of the respective sets of electrodes or by providing apertures or windows as schematically illustrated before in connection with FIGS. 3 and 4.

Turning now to FIG. 8, there is shown in schematic cross-sectional side view one particular example of the coincident electrode detector arrangement of this invention utilized with a microchannel array plate in a sealed "wafer" tube. Microchannel array plates are constructed from a semiconducting glass which has a work function of about 5 eV. An uncoated microchannel array plate can thus be used as an efficient photomultiplier only at EUV wavelengths in the range 300 to 1250 A. The wavelength range can, however, be extended in a number of ways. First, a microchannel array plate can be coated with an opaque $MgF_2$ cathode at the input of the microchannel to produce a high efficiency open structure detector for soft x-ray in the wavelength range from 20 to 300 A. Second, it is possible to integrate the microchannel array plate and anode array with either an opaque photocathode, or with a semitransparent photocathode in proximity focus at the input of the microchannels, in a sealed tube for use at ultra-violet and visible wavelengths.

Referring now to FIG. 8, thereis shown one example of a "wafer" tube utilizing a photocathode. A glass window 87 overlies a photocathode 88 which is placed at the entry face of a microchannel array plate 89. A ceramic sidewall spacer 91 spaces the various elements with respect to each other and connecting electrodes 92 and 93 are provided to make electrical contact with the photocathode and microchannel array plate for applying the proper biasing potentials thereto. An anode array 94 is provided in proximity focus to the output face of the microchannel array plate 89. An insulating spacer 96 may be provided to accurately space the output face of the microchannel array plate with respect to the anode array. The anode array 94 is conveniently situated on top of a multilayer ceramic substrate 97 with there being provided conducting electrodes 98 for contacting the ceramic substrate to provide proper biasing and accelerating potentials for electrons generated in the microchannel array plate. Electrical connections to the detector array may be made through connecting pins 98 on the bottom of the multilayer ceramic substrate 97 with connecting paths such as path 99 formed through the ceramic substrate and contacting the individual electrode elements. This is thus one construction which advantageously utilizes the detector array of the present invention to provide a relatively large number of picture elements without the necessity of separate amplifiers for each picture element.

Although the invention has been shown and described with reference to specific embodiments, various modifications can of course be made by those skilled in this art without departing from the true spirit and scope of the invention.

We claim:

1. A method of detecting photons comprising the steps of providing at least one microchannel array plate having an input face for admitting photons and an output face, providing a plurality of sets of electrodes in proximity focus to the output face of the microchannel array plate with each set including a plurality of linearly extending parallel individual electrode elements, orienting the sets of electrodes at angles with respect to one another so that individual elements of each set intersect and overlap individual elements of the other sets to form a charged particle counting zone in the vicinity of overlapped elements, electrically insulating the intersecting and overlapping elements from each other, focusing a two-dimensional charged particle source on the sets of electrode elements, separately amplifying any signals on each individual electrode element to form pulses, and detecting coincidence of pulses on an individual element in each of the sets to thereby detect impact of charged particles on the charged particle counting zone formed by overlapping of the individual elements having coincident pulses.

2. A method in accordance with claim 1 including the step of configuring the individual electrode elements in the charged particle counting zones such that each individual element has approximately the same surface area exposed to the source of charged particles.

3. A two-dimensional photon-counting detector array comprising at least one microchannel array plate having an input and an output face, a detector array in proximity focus to the output face of the microchannel array plate, said detector array comprising a plurality of sets of linearly extending electrode elements, each of the sets of electrodes disposed at an angle with respect to other sets so that individual electrode elements of each set intersect and overlap individual electrode elements of other sets to form picture elements where they overlap, electrical insulation between the overlapped electrodes forming the picture elements, amplifier means for each of said electrode elements, coincidence detection means for detecting approximately coincident output pulses from an amplifier means in each set of electrode elements and generating an event signal, the occurrence of which is indicative of charged particles impinging in the picture element formed by the overlapping of the respective elements with respect to which the coincident pulses appeared.

4. A photon-counting detector array in accordance with claim 3 in which said individual electrode elements are solid and in which the widths of said individual elements in each set is different from the widths in other sets, so that approximately equal surface areas of each intersecting electrode element are exposed in the charged particle counting zones.

5. A photon-counting detector array in accordance with claim 3 in which all overlapped individual electrode elements other than the bottom one have openings formed therein of dimensions such that an approximately equal surface area of each of the different individual electrodes is exposed in the charged particle counting zones.

6. A photon-counting detector array in accordance with claim 3 in which two sets of electrode elements are provided, one of said sets having $n$ elements and one of said sets having $m$ elements, and wherein $n+m$ amplifier and discriminator means are provided, whereby intersection and overlapping of said $n$ elements and said $m$ elements forms $n \times m$ charged particle counting zones.

7. A photon-counting detector array in accordance with claim 6 wherein said two sets of electrode elements form an $n \times m$ matrix array.

8. A photon-counting detector array in accordance with claim 6 wherein a linear extended array is formed by disposing a portion of the $n$ elements parallel to each other and side by side and the remainder of said $n$ elements end to end with respect to said side by side elements but spaced a small distance apart, and wherein all of said $m$ elements are convoluted to intersect and overlap all of said $n$ elements, whereby an array is formed having $n \times m$ charged particle counting zones but being of a matrix configuration of $n/c \times (m \times c)$ where $c$ is greater than 1.

9. A two-dimensional photon-counting detector array in accordance with claim 3 including logic means coupled to said coincidence detection means for encoding the event signal and the address of the picture element with which the event signal is associated.

10. A two-dimensional photon-counting detector array in accordance with claim 9 including display means coupled to said logic means for providing a digital display of event signals accumulated over a predetermined integration interval for any selected picture element.

11. A two-dimensional photon-counting detector array in accordance with claim 10 including additional display means coupled to said logic means for providing an analog display representative of event signals accumulated over a predetermined integration interval for a plurality of said picture elements.

* * * * *